United States Patent [19]

Özelli et al.

[11] 3,952,079

[45] Apr. 20, 1976

[54] PROCESS OF RELEASING POLYURETHANE FOAMS USING ALUMINUM SALTS OF FATTY ACID MIXTURES

[75] Inventors: Riza Nur Özelli, Neuss; Günter Klement; Eugen Scheidt, both of Dusseldorf-Holthausen, all of Germany

[73] Assignee: Henkel & Cie G.m.b.H., Dusseldorf, Germany

[22] Filed: Aug. 7, 1974

[21] Appl. No.: 495,395

[30] Foreign Application Priority Data
Aug. 10, 1973 Germany............................ 2340574

[52] U.S. Cl................................. 264/45.5; 264/51; 264/338; 264/DIG. 14
[51] Int. Cl.$^2$...................... B29D 27/00; B29C 1/04
[58] Field of Search .............. 264/54, 338, 45.5, 51, 264/DIG. 14

[56] References Cited
UNITED STATES PATENTS

| | | | |
|---|---|---|---|
| 3,127,457 | 3/1964 | Di Pinto............................. | 264/338 |
| 3,468,989 | 9/1969 | McMillan............................ | 264/338 |
| 3,624,190 | 11/1971 | Cekada, Jr. et al................. | 264/338 |
| 3,650,995 | 3/1972 | Erickson............................. | 264/338 |
| 3,726,952 | 4/1973 | Boden et al......................... | 264/338 |

OTHER PUBLICATIONS

"A Word About Mold Releases," Plastics Design & Processing, Aug., 1969, p. 33.

*Primary Examiner*—Robert F. White
*Assistant Examiner*—Gene Auville
*Attorney, Agent, or Firm*—Hammond & Littell

[57] ABSTRACT

The invention involves the use of aluminum salts of a fatty acid mixture of fatty acids having 12 to 22 carbon atoms consisting of
a. from 42% to 50% by weight of mono-olefinically unsaturated fatty acids, wherein at least 42% by weight are oleic acid,
b. from 42% to 48% by weight of saturated fatty acids, wherein at least 42% by weight are saturated fatty acids having 16 to 18 carbon atoms, and
c. from 2% to 10% by weight of poly-olefinically unsaturated fatty acids,
as a mold releasing agent for the release of polyurethane foams from molds.

1 Claim, No Drawings

PROCESS OF RELEASING POLYURETHANE FOAMS USING ALUMINUM SALTS OF FATTY ACID MIXTURES

THE PRIOR ART

The production of polyurethane foams is effected partly continuously by free foaming is so-called "blocks" and partly in closed molds, whereby, depending on the composition of the polyurethane mixtures, open-pored or close-pored foams with or without a closed outer skin are formed. The release of the foams formed from the mold raises special problems in the case of polyurethane foams, because the low-molecular-weight isocyanates used for their production, which are known as adhesives for many purposes, can come easily in contact with the mold wall. The difficulties in mold release, which already exist in casting polyurethane, are considerably increased in polyurethane foam, due to the nature of this material. Compared to the dense casting polyurethane, the foamed material has a much lower tensile strength, so that the material is easier to break when it is removed from the mold. Special difficulties are encountered additionally in the production of foams with a closed surface, the so-called integral skin foams, since in these foams the mold wall must be perfectly reproduced even after prolonged use of the mold wall. In addition, the surface layer is in many cases subsequently pigmented by a so-called mordant, for example, in shoe bottoms. Suitable mordants consist, for example, of solutions of organic dyes in a solvent mixture. Irregular coloring, which manifests itself, for example, in spots and flow disturbances, which cannot be tolerated, are already produced by minor surface roughnesses, which can be caused by the detachment of fine films. In other cases, for example, in the production of arm rests, cushions and other furniture parts, completely uniform and glossy surfaces are required, which permit spot-free varnishing if necessary.

These difficulties cannot be satisfactorily eliminated today, even by the use of relatively large amounts of mold release agents. The conventional mold release agents consist preferably of solutions of hydrocarbon waxes, partly in mixture with silicones, in benzine and similar solvents. In some cases it is necessary to apply wax-like pastes on the mold wall, and to polish them in order to smooth the surface. The method, however, cannot be used particularly for the production of integral skin foams, because the fine unevenesses of the mold surface which are to be reproduced in the foam, are leveled by the mold release agent. Since mold release agents which form rapidly a homogenous film in the mold, are required in practice for technical reasons, because of the short cycle times of 30 to 60 seconds, the above-mentioned mold release agents are not suitable for releasing of polyurethane foams from the molds.

Metal salts of stearic acid, oleic acid, naphthenic acid, behenic acid, erucic acid or montanic acid have also been suggested as mold release agents. These metal salts contain, as a metal component, calcium, magnesium, strontium, barium, aluminum, zinc, manganese, bismuth of silver. These metal salts have the disadvantage that they are only partly soluble in organic, rapidly evaporating solvents, so that the formation of a homogenous thin mold release film in the molds is very difficult, and non-uniform surfaces are thus formed.

OBJECTS OF THE INVENTION

An object of the present invention is the development of an improvement in the process of releasing foamed polyurethane from molds by the use of mold release agents comprising the use of aluminum salts of mixtures of saturated and unsaturated fatty acids for releasing polyurethane foams from the molds.

Another object of the present invention is the development of, in the process for the production of polyurethane foams comprising coating a mold with a thin film of a mold release agent, foaming polyurethane in said mold and removing the foamed polyurethane from said mold, the improvement consisting of using an aluminum salt of a fatty acid mixture of fatty acids having 12 to 22 carbon atoms consisting of
a. from 42% to 50% by weight of mono-olefinically unsaturated fatty acids, wherein at least 42% by weight are oleic acid,
b. from 42% to 48% by weight of saturated fatty acids, wherein at least 42% by weight are saturated fatty acids having 16 to 18 carbon atoms, and
c. from 2% to 10% by weight of poly-olefinically unsaturated fatty acids, as said mold release agent.

A further object of the invention is the obtention of compositions of the above aluminum salts of a fatty acid mixture with a fast evaporating solvent.

These and other objects of the present invention will become more apparent as the description thereof proceeds.

DESCRIPTION OF THE INVENTION

The present invention is therefore based on the problem of finding a mold release agent which has a great release effect for polyurethane foam, particularly polyurethane integral skin foams, when applied from a diluted solution in a very thin layer on the mold wall, and which ensures at the same time a perfect surface quality, if necessary, an exact reproduction of the mold surface, and which provides beyond that favorable conditions for any desired after-treatment of the surface by mordanting, varnishing, pasting or similar manipulations.

This problem is solved in that aluminum salts of a fatty acid mixture of $C_{12}$ to $C_{22}$ fatty acids consisting of
a. 42% to 50% of mono-olefinically unsaturated fatty acids, wherein oleic acid is present in an amount of at least 42% by weight,
b. 42% to 48% by weight of saturated fatty acids, where the $C_{16}$ to $C_{18}$ fatty acids are present in an amount of at least 42% by weight, and
c. 2% to 10% by weight of poly-olefinically unsaturated fatty acids,
are used for the mold release of polyurethane foams.

More particularly, therefore, the present invention involves, in the process for the production of polyurethane foams comprising coating a mold with a thin film of a mold release agent, foaming polyurethane in said mold and removing the foamed polyurethane from said mold, the improvement consisting of using an aluminum salt of a fatty acid mixture of fatty acids having 12 to 22 carbon atoms consisting of
a. from 42% to 50% by weight of mono-olefinicially unsaturated fatty acids, wherein at least 42% by weight are oleic acid, b. from 42% to 48% by weight of saturated fatty acids, wherein at least 42% by weight are saturated fatty acids having 16 to 18 carbon atoms, and c. from 2% to 10% by weight of poly-olefinically unsaturated fatty acids, as said mold release agent.

In addition, the present invention involves a mold release agent composition consisting of from 0.1% to 2% by weight of an aluminum salt of a fatty acid mixture of fatty acids having 12 to 22 carbon atoms consisting of a. from 42% to 50% by weight of mono-olefinically unsaturated fatty acids, wherein at least 42% by weight are oleic acid, b. from 42% to 48% by weight of saturated fatty acids, wherein at least 42% by weight are saturated fatty acids having 16 to 18 carbon atoms, and c. from 2% to 10% by weight of poly-olefinically unsaturated fatty acids, and the remainder a highly volatile organic solvent boiling at temperatures below 140°C selected from the group consisting of aliphatic hydrocarbons, aromatic hydrocarbons, chlorinated aliphatic hydrocarbons, alkanones and mixtures thereof.

The predominant portion of the mono-olefinically unsaturated fatty acids in the fatty acid mixtures consists of oleic acid in an amount of at least 42% by weight of the total fatty acids. Smaller amounts of other mono-olefinically unsaturated fatty acids, such as hexadecenoic acid may be present in the order of 2% to 8% by weight. The 42% to 48% by weight amount of saturated fatty acids can consist of lauric acid, myristic acid, palmitic acid, margaric acid, stearic acid, arachic acid and behenic acid; however, the acids lauric acid, myristic acid, margaric acid, arachic acid and behenic acid are only of minor importance since their portion in the fatty acid mixture does not exceed 6% by weight. The bulk of the saturated fatty acids in the fatty acid mixture is represented by the $C_{16}$ and $C_{18}$ fatty acids palmitic acid and stearic acid. Preferably, palmitic acid is present in an amount of 22% to 28% by weight, and stearic acid is present in an amount of 14% to 20% in the entire fatty acid mixture. The portion of poly-olefinically unsaturated fatty acids of the order of 2% to 10% by weight of the total fatty acids consists primarily of linoleic acid, which can be accompanied by smaller amounts of linolenic acid. The amount of linoleic acid in the entire fatty acid mixture is between 3% and 8% by weight.

The aluminum salts of these fatty acid mixtures, when applied to molds, have an excellent mold release effect and ensure a perfect surface quality of the molded polyurethane bodies produced. The mold release agents according to the invention are beyond that characterized by a very high productivity.

The aluminum salts of fatty acid mixtures used according to the invention as mold release agents are utilized in the form of solutions in highly volatile organic solvents containing from 0.1% to 2% by weight, preferably from 0.5% to 1% by weight of the aluminum salts. The solvents are, for example, those highly volatile organic solvents boiling at temperatures below 140°C, such as aliphatic or aromatic hydrocarbons, chlorinated aliphatic hydrocarbons, as well as mixtures thereof, or mixtures of the above-mentioned solvents with alkanones. Examples of the above are light benzines from mixtures of pentane to heptanes, toluene, xylene, methylene chloride, dichloroethylene, trichloroethylene, acetone and methylethyl ketone.

Repeated mold release after a single application to the mold of the solutions of the aluminum salts of fatty acid mixtures according to the invention is possible. On the other hand, if the mold release agents constantly applied, there is a very low waste quota by adhering polyurethane foam, even if the mold release agent was not applied very carefully. Since a very small amount of the aluminum salts according to the invention, on the nature of 0.2gm to 0.4gm per $m^2$, suffices to achieve a satisfactory mold release, the reproduction even of minute surface features of the mold in the foam presents no difficulties. The molded polyurethane and polyurethane foam parts removed by means of the aluminum salts according to the invention, which are treated with paint mordants and varnishes without intermediate cleaning, show after drying a completely uniform appearance without spots or flow disturbances.

For use as mold release agents, the molds of steel, aluminum, chrome-plated steel or synthetic resin used for the production of the molded polyurethane or polyurethane foam parts are brushed or sprayed in a thin layer with the solutions of the aluminum salts of fatty acid mixtures according to the invention.

The following examples will describe the subject of the invention more fully, without limiting it, however.

EXAMPLES

The mold release effect of the parting layer produced by means of the aluminum salts of the fatty acid mixtures according to the invention and other comparison products was tested by means of the tests described below.

TEST (A)

Release of hard polyurethane foam (BAYDUR 20 By Farberfabriken Bayer AG).

Formula:
100 parts by weight of a polyol (DESMOPHEN DD 1650)
10 parts by weight of an expanding agent (monofluorotrichloromethane)
105 parts by weight of a "crude" diphenylmethane diisocyanate (DESMODUR 44 V 10)

The components were mixed rapidly with each other in the indicated order and poured into a steel mold which had been preheated to 55° ± 5°C, and were there foamed in the open. After 15 minutes at 55°C the polyurethane foam formed was removed.

Sheets of stainless steel fitting on the mold bottom (18 × 12 cm) were cleaned with the scouring agent, washed repeatedly with water and finally with acetone and dried. Subsequently, the sheets were preheated to 55°C and sprayed once with a 1% mold release solution as described later. The sheets were placed on the bottom of the mold and the polyurethane mixture was subsequently poured on.

After the removal from the mold, the detachment of the sheets from the polyurethane foam was judged as follows:

1 = spontaneous release
2 = release with slight effort
3 = release with major effort, breaks in the polyurethane foam at several small spots
4 = breaks in the polyurethane foam of 10% to 50% of the parting surface 5 = breaks in the polyurethane foam of more than 50% of the parting surface.

TEST (B)

Release of semi-hard integral foam (BAYFLEX 30 Farbenfabriken Bayer AG).

Formula:

100 parts by weight of a premix of an etherpolyol, expanding agent and amine/catalyst system (DESMOPHEN 5900 BT)

45 parts by weight of a "crude" DESMODUR 44 stabilized against hydrolysis (DESMODUR CD)

The components were mixed rapidly at room temperature and poured into a slightly conical cylinder mold preheated to 55° ± 5°C. The mold was 110 mm high, the diameter on the bottom was 100 mm, and, on the cover, 99 mm to facilitate the removal. The amount of filling (= volumetric weight of the molded part) was 280 gm/l. After the mold was charged and closed, the molding mass was kept for 15 minutes at 55°C. Subsequently, the foam was removed and the release test proper was performed after it had been stored for 1.5 hours to cool the interior of the foam which was at first hot and had little break-resistance.

In order to test the release effect of the various mold release agents, a metal disk was placed on the bottom of the mold, which had a diameter of 58 mm and a thickness of 5 mm. Nine blocks with a base of 1 cm$^2$ and a height of 5 mm, maintained an interval of 5 mm apart were placed symmetrically on the "adhesive surface" of this metal disk in order to increase the latter. The total surface area was thus 55.6 cm$^2$. The "adhesive body" was produced from one piece by cutting. Cutting traces could be seen clearly on the surface.

As a counter-part to the "adhesive body", a disk with a diameter of about 40 mm provided with a threaded screw was so secured in the cover of the mold that it was surrounded on all sides by the polyurethane foam. This test piece was used in three ways to evaluate the compound used as a mold release agent.
  a. by clamping in a tensile testing machine, the release force could be determined in kg at a drawing rate of 50 mm/min.
  b. the release force was measured as in (a), but repeatedly without another coat of the mold release agent. The number of mold releases until the foam broke for the first time, due to a decline of the release effect, was determined.
  c. After the removal of the "adhesive body", the foam surface was evaluated visually.

TEST (C)

Release of semi-hard integral skin foam BAYFLEX 30 Farbenfabriken Bayer AG)

Formula:

100 parts by weight of a premix of an etherpolyol, expanding agent and amine/catalyst system (DESMOPHEN 5900 BT)

45 parts by weight of a "crude" DESMODUR 44 stabilized against hydrolysis (DESMODUR CD)

1. Free-foaming on steel sheets

The components were mixed rapidly with each other at room temperature, poured into a steel mold heated to room temperature, and foamed there open. After 10 minutes at room temperature (or at the reaction temperature) the polyurethane formed foam was removed from the mold.

Sheets of stainless steel (8 × 12 cm) fitting on the mold bottom were carefully cleaned (Test A), dried, and sprayed on at room temperature with a 1% mold release solution. The sheets were place on the mold bottom and the polyurethane foam mixture was subsequently poured on.

The release effect was evaluated according to the criteria described in Test (A).

2. Free-foaming on epoxy resin sheets

The components were processed as in Test (C) (1) above and poured in a steel mold containing a carefully cleaned epoxy resin plate (30 × 20 × 1 cm), which had been sprayed at room temperature once with a 1% mold release solution. The epoxy resin plate was prepared from a mixture of 10 parts by weight Araldit SW 418 and 2 parts by weight of Hardener HY 418 (CIBA-GEIGY). After storage for 10 minutes at room temperature (or at the reaction temperature) the polyurethane foam was removed from the mold.

The evaluation of the release effect was effected according to the criteria described under Test (A).

3. Pressure-foaming on epoxy resin sheets

The components were processed as in Test (C) (1) and poured into the mold which was kept at room temperature. The mold consisted of an epoxy resin plate inserted in a wood frame, an attached wood frame (inside dimensions: 16 × 16 × 3 cm and a steel cover of 5 mm thickness. The epoxy resin plate was prepared as in Test (C) (2). The steel cover was kept pressed on during the pressure-foaming by means of two screw clamps.

The epoxy resin mold bottom was sprayed with the mold release agent according to Test (C) (2). The inner walls of the attached wood frame and the inside of the steel cover were likewise treated.

After storage for 10 minutes at room temperature, (or at the reaction temperature), the polyurethane foam was removed from the mold.

The evaluation of the release effect on the epoxy resin mold bottom was done according to the criteria under Test A).

EXAMPLE 1

For carrying out this test, the aluminum salt of the fatty acid mixture indicated below was dissolved to a 1% solution in methylene chloride:

| Fatty acid composition in % by weight | |
|---|---|
| $C_{14}$-saturated | = 1.7% (myristic acid) |
| $C_{16}$-saturated | = 26.0% (palmitic acid) |
| $C_{16}$-unsaturated | = 4.5% (hexadecenoic acid) |
| $C_{17}$-saturated | = 2.2% (margaric acid) |
| $C_{18}$-saturated | = 16.2% (stearic acid) |
| $C_{18}$-unsaturated | = 44.5% (oleic acid) |
| $C_{18}$-diunsaturated | = 4.9% (linoleic acid) |
| | 100.0% |

When this solution is sprayed on the metal molds, a very thin, even and practically invisible film was formed and the solvent evaporated completely in a few seconds.

The mold release tests of the application of the mold release agent of the invention, as outlined in Tests (A) to (C), yielded the following values:

Release effect according to Test (A): grade 1
Adhesive value according to Test (B) (a): 13 kg Number of mold releases up to first adhesion of the PUR (polyurethane) foam according to Test (B) (b): 10

Visual evaluation according to Test (B) (c): glossy, spot-free surface, exact reproduction of the test piece surface Release effect according to Test (C) (1): grade 1

Visual evaluation according to Test (C) (1A): glossy, spot-free foam surface, exact reproduction of the test piece surface.

Release effect according to Test (C) (2): grade 1

Visual evaluation according to Test (C) (2A): glossy, spot-free foam surface, exact reproduction of the test piece surface Release effect according to test (C) (3): grade 1

Visual evaluation according to Test (C) (3A): glossy surface, exact reproduction of the test piece surface.

EXAMPLE 2 (comparison)

For comparison the aluminum salt of stearic acid, as well as the aluminum salt of oleic acid both in a 1% methylene chloride solution were used for the tests according to Test (A) and (B). The results are listed below:

Aluminum salt of stearic acid

Release effect according to Test (A): grade 2

Adhesive value according to Test (B) (a): 13 kg

Number of mold releases up to first adhesion of the PUR foam according to Test (B) (b): 6

Visual evaluation according to Test (B) (c): partly glossy, but blistery surface.

The aluminum salt of stearic acid is not completely soluble in rapidly evaporating solvents (methylene chloride or benzine - b.p. 65°–95°C)

Aluminum salt of oleic acid

Release effect according to Test (A): grade 2

Adhesive value according to Test (B) (a): 17 kg

Number of mold releases up to first adhesion of the PUR foam according to test (B) (b): 5

Visual evaluation according to Test (B) (c): highly blistery, spotty surface.

EXAMPLE 3 (comparison)

In another comparison test, the aluminum salt of hydrogenated palmkernel fatty acids ($C_{12}$ to $C_{18}$) in a 1% solution in methylene chloride was used for the Test (A) and (B). The results are listed below:

Aluminum salt of a hydrogenated palmkernel fatty acid mixture

Release effect according to Test (A): grade 2

Adhesive value according to Test (B) (a): 19 kg

Number of mold releases up to first adhesion of the PUR foam according to Test (B) (b): 7

Visual evaluation according to Test (B) (c): blistery to spotty surface.

EXAMPLE 4 (comparison)

In this comparison test, the aluminum salt of the fatty acid mixture described below was used in a 1% solution in methylene chloride for the Tests A) and B).

| Fatty acid composition in % by weight | |
|---|---|
| $C_{12}$-saturated | = 1.9% (lauric acid) |
| $C_{14}$-saturated | = 0.7% (myristic acid) |
| $C_{16}$-saturated | = 13.9% (palmitic acid) |
| $C_{18}$-saturated | = 5.5% (stearic acid) |
| $C_{18}$-unsaturated | = 48.5% (oleic acid) |
| $C_{18}$-diunsaturated | = 28.4% (linoleic acid) |
| $C_{20}$-saturated | = 1.1% (arachic acid) |
| | 100.0% |

The results are listed below:

Release effect according to Test (A): grade 2

Adhesive value according to Test (B) (a): 17 kg

Number of mold releases up to first adhesion of the PUR foam according to Test (B) (b): 5

Visual evaluation according to Test (B) (c): irregular spotty and partly glossy surface.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. In the process for the production of molded articles of integral skin polyurethane foams by foaming a polyurethane reaction mixture in a mold, comprising coating a mold with a thin film of a mold release agent, foaming a polyurethane reaction mixture in said mold and removing the foamed integral skin polyurethane from said mold, the improvement consisting of applying a thin film of from 0.2gm to 0.4gm per m² to said mold using an aluminum salt of a fatty acid mixture of fatty acids having 12 to 22 carbon atoms consisting of a. from 42% to 50% by weight of mono-olefinically unsaturated fatty acids, wherein at least 42% by weight of the total acids are oleic acid, b. from 42% to 48% by weight of saturated fatty acids, wherein at least 42% by weight of the total acids are saturated fatty acids having 16 to 18 carbon atoms, of which from 22% to 28% by weight of the total fatty acids is palmitic acid and from 14% to 20% by weight of the total fatty acids is stearic acid, and c. from 3% to 10% by weight of poly-olefinically unsaturated fatty acids of which from 3% to 8% by weight of the total fatty acids is linoleic acid, as said mold release agent said aluminum salt being dissolved in an amount of from 0.1% to 2% by weight in a highly volatile organic solvent boiling at temperatures below 140°C selected from the group consisting of aliphatic hydrocarbons aromatic hydrocarbons, chlorinated aliphatic hydrocarbons, alkanones and mixtures thereof.

* * * * *